(12) United States Patent
Desbiez-Piat

(10) Patent No.: US 6,481,053 B2
(45) Date of Patent: Nov. 19, 2002

(54) HIGHLY FLEXIBLE ELASTIC HINGE

(75) Inventor: Christophe Desbiez-Piat, Ramberbillers (FR)

(73) Assignee: Chevassus S.A., Morez (FR)

(*) Notice: Subject to any disclaimer, the term of this patent is extended or adjusted under 35 U.S.C. 154(b) by 0 days.

(21) Appl. No.: 10/044,528

(22) Filed: Jan. 11, 2002

(65) Prior Publication Data

US 2002/0124350 A1 Sep. 12, 2002

Related U.S. Application Data

(63) Continuation of application No. PCT/IB00/00932, filed on Jul. 10, 2000, now abandoned.

(30) Foreign Application Priority Data

Jul. 13, 1999 (FR) .............................................. 99 09299

(51) Int. Cl.[7] .................................................. G02C 5/22
(52) U.S. Cl. ........................................ 16/228; 351/153
(58) Field of Search ......................... 16/228, 225, 227; 351/113, 153, 140, 121; 403/120, 119, 113, 144, 147; 264/239, 241, 242

(56) References Cited

U.S. PATENT DOCUMENTS

| | | | |
|---|---|---|---|
| 4,932,771 A | | 6/1990 | Nowottny |
| 5,009,495 A | * | 4/1991 | Williams ................. 16/228 |
| 5,402,552 A | * | 4/1995 | Chen ...................... 16/228 |
| 5,818,567 A | * | 10/1998 | Sakai ..................... 16/228 |
| 6,019,467 A | * | 2/2000 | Kawamoto ............... 16/228 |
| 6,168,341 B1 | * | 1/2001 | Chene et al. .............. 16/228 |
| 6,336,251 B1 | * | 1/2002 | Sartor .................... 16/228 |

FOREIGN PATENT DOCUMENTS

| | | |
|---|---|---|
| DE | 195 11 167 | 10/1996 |
| FR | 2 698 121 | 5/1994 |
| FR | 2 746 151 | 9/1997 |
| FR | 2 769 722 | 4/1999 |
| WO | 92 15916 | 9/1992 |

* cited by examiner

*Primary Examiner*—Doug Hutton
(74) *Attorney, Agent, or Firm*—Henderson & Sturm LLP

(57) ABSTRACT

The invention concerns an elastic hinge for specticles frame comprising two fixed (5) and mobile (7) hinge elements, articulated about an axis of rotation (R) by a pivoting head (7A) of one (7) of the elements inserted in a pivoting head (5A) of the other element (5) and by a link (9) housed in succession in an inner passage (5D, 7D) of the two elements emerging into the pivoting heads. The invention is characterized in that each pivoting head (5A, 7A) has at the opening of the passage (5D, 7D) a stop member (B1, B2) on the outer side of the frame forming by the matching shape of one (B1) with the other (B2) a pivoting interface about a second axis of rotation (R'), the link (9) being arranged between the two axes of rotation (R, R') when the bow is in a normal opening position. The hinge has two stable closing and opening positions as well as an additional unstable opening position.

10 Claims, 3 Drawing Sheets

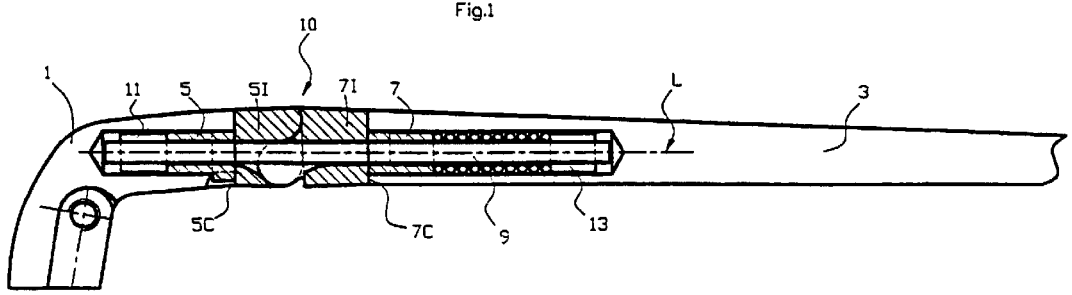
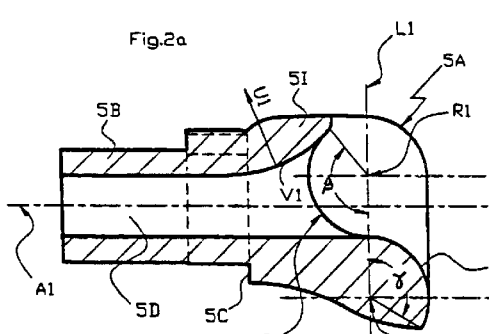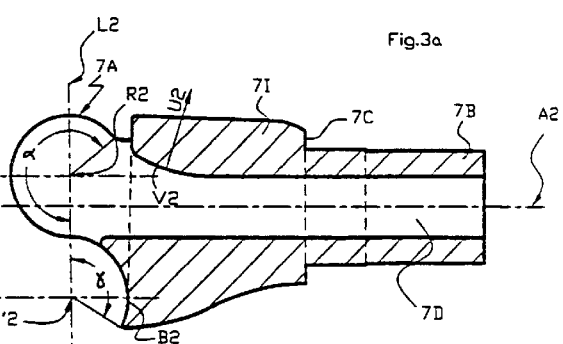
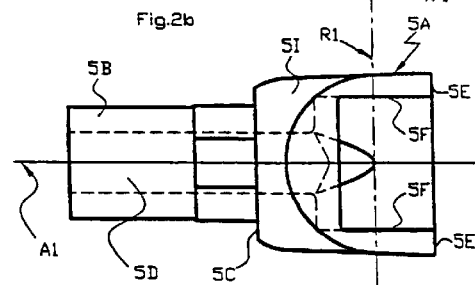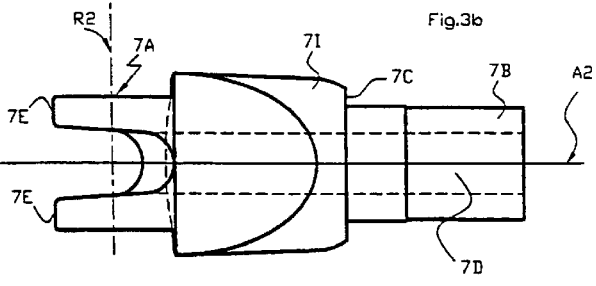

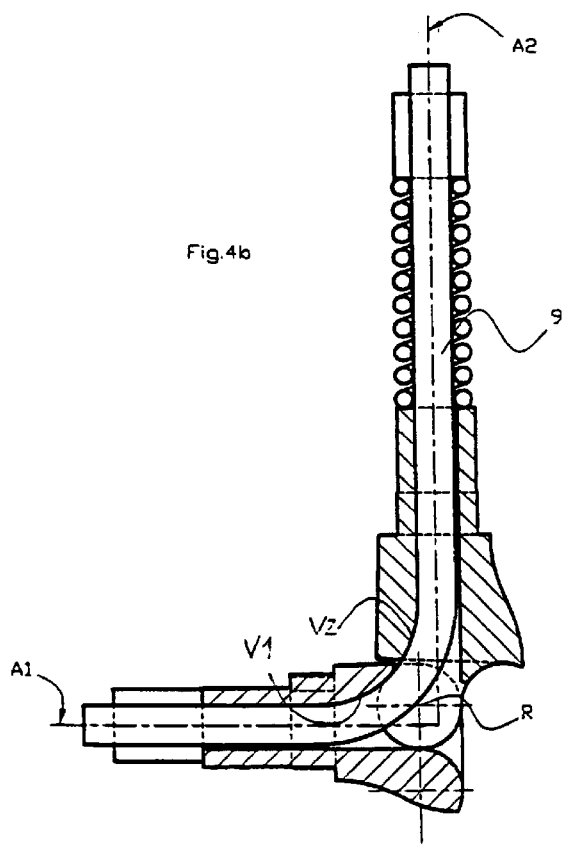
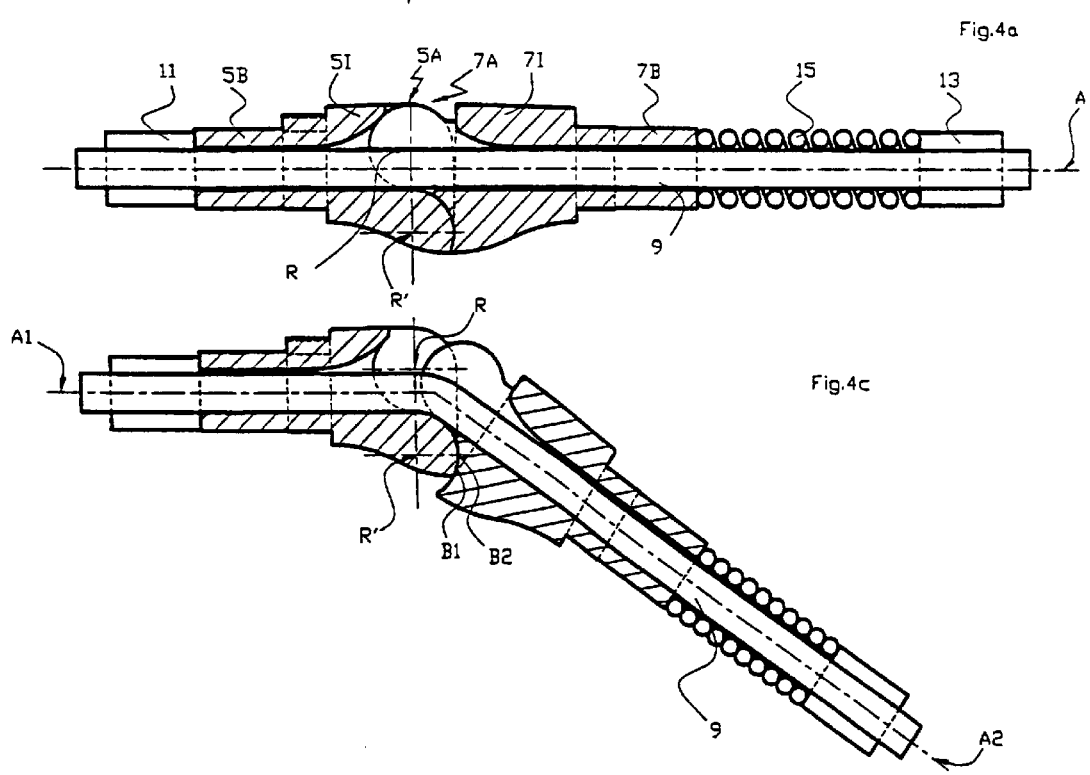

HIGHLY FLEXIBLE ELASTIC HINGE

CROSS-REFERENCE TO RELATED APPLICATIONS

This application is a continuation application of International Application PCT/IB00/00932 filed Jul. 10, 2000, which claims priority of French Patent Application No. 99.09299 filed Jul. 13, 1999. International Application PCT/IB00/00932 was published in French under PCT Article 21(2) and is now abandoned.

BACKGROUND OF THE INVENTION

1. Field of the Invention

The invention relates to an elastic spectacle-frame hinge, and more particularly to a hinge which comprises two elements, a fixed element and a mobile element, which are connected to a front and to a side-piece of the frame respectively.

The two elements are articulated in relation to one another about an axis of rotation by a pivoting head on one of the elements, which head is inserted in a pivoting head on the other element, and by a link which is disposed inside two elements and passes successively through the pivoting heads.

2. Description of the Related Art

A hinge of this type is known, in particular, from Patent Application FR 2 698 121, which was published on May 20, 1994. The pivoting heads are spherical in shape and pivot about an imaginary axis passing through the centre of the two spheres.

The two hinge elements are perforated by an internal duct so as to permit the successive passage of a strand which is anchored in each duct by one end. The tensile force exerted by the fixed element on the mobile element is proportional to the deformation of the strand in the event of the latter being, by nature, elastic. If the strand is non-extensible, the tensile force is proportional to the deformation of a spring mounted between the mobile element and the point at which the strand is anchored.

When the side-piece of the frame is in the normal opening position, the strand extends parallel to the direction of axial alignment of the two elements, while at the same time being offset in relation to the axis of rotation on an outer side of the frame. "Outer" is understood to mean the region which is not contained between the front and the two side-pieces in the normal opening position. Conversely, the region contained between the front and the two side-pieces forms the inside of the frame.

When the frame is closed, the strand is offset progressively from one side to the other in relation to the axis of rotation. The tensile force generates a return torque which is cancelled when the middle fibre of the strand passes vertically across the axis of rotation. This results in a bistable effect which ought to endow the hinge with a closing position and a normal opening position which are stable.

It is found to be the case, however, that nothing permits the opposing of the tensile force in the normal opening position, in which the strand is straight. Being offset outwards in relation to the axis of rotation, the strand exerts, on the mobile element, a torque which leads to pivoting of the side-piece towards an extra opening position.

In other words, in the known hinge, although the bistable effect leads to a stable closing position, it seems to lead, on the other hand, not to a stable normal opening position, but in fact to a stable over-opening position. It is clear that a situation of this kind does not make the frame comfortable to use, and reduces its stability when worn.

BRIEF SUMMARY OF THE INVENTION

One of the objects of the invention is to improve a type of elastic hinge by using a link to join together the elements connected to the front and side-piece, so as impart a stable character to the closing and normal opening positions, and an unstable character to the extra opening position.

To that end, the subject of the invention is an elastic spectacle-frame hinge comprising two hinge elements, a fixed element and a mobile element, which are connected to a front and to a side-piece of the frame respectively and are articulated in relation to one another about an axis of rotation by a pivoting head on one of the elements, which head is inserted in a pivoting head on the other element, and by a link which is successively accommodated in an internal duct in the two elements which opens into the pivoting heads and is offset, in relation to the axis of rotation, from an inner side to an outer side of the frame when the side-piece pivots, in relation to the front, from a closing position to a normal opening position, characterised in that each pivoting head possesses a stop at the mouth of the internal duct on the outer side of the frame, which stops form, as a result of complementarity of shape of one with the other, an interface for pivoting about a second axis of rotation, the link being disposed between the two axes of rotation when the side-piece is in the normal opening position.

When the side-piece is in the normal opening position, the two complementary stops make it possible to neutralise the torque that tends to make the side-piece pivot outwards into an over-opening position. In other words, the normal opening position is a stable position.

The stops are arranged, as a result of complementarity of shape at a pivoting interface, so as to enable the side-piece to pivot from the stable normal opening position to an extra outward opening position. In the course of over-opening, the pivoting heads move apart from one another and the male and female knuckles reduce their contact surface.

The stops are formed at the mouth of the duct on the outer side of the frame so that the link passing successively through the pivoting heads remains offset inwards in relation to the second axis of rotation. In this way, the tensile force of the link creates a torque for returning the side-piece that tends to oppose the pivoting of the latter into over-opening. This return torque is counterbalanced only when the pivoting heads are inserted in one another again and when the male knuckles are in contact with a guide surface connecting the two female knuckles, that is to say in the normal opening position. In other words, the over-opening position is unstable.

BRIEF DESCRIPTION OF THE DRAWINGS

Other advantages of the invention will become apparent on reading the description of a mode of embodiment which is illustrated by the drawings.

FIG. 1 is a view, in longitudinal section, of a side-piece belonging to a spectacle frame, which side-piece is articulated on a front lug by a hinge according to the invention.

FIG. 2a shows, in the longitudinal sectional plane in FIG. 1, a hinge element which is connected to the front.

FIG. 2b is a top view of FIG. 2a.

FIG. 3a shows, in the longitudinal sectional plane in FIG. 1, a hinge element which is connected to the side-piece.

FIG. 3b is a top view of FIG. 3a.

FIG. 4a is a view, in longitudinal section, of the hinge in FIG. 1 when the side-piece is in the normal opening position, that is to say substantially perpendicular to the front of the frame.

FIG. 4b is a view, in longitudinal section, of the hinge in FIG. 1 when the side-piece is in the closing position, that is to say substantially parallel to the front.

FIG. 4c is a view, in longitudinal section, of the hinge in FIG. 1 when the side-piece is in the extra opening position, that is to say substantially oblique towards the outside of the frame vis-à-vis the front.

DETAILED DESCRIPTION OF THE INVENTION

Figure 5:
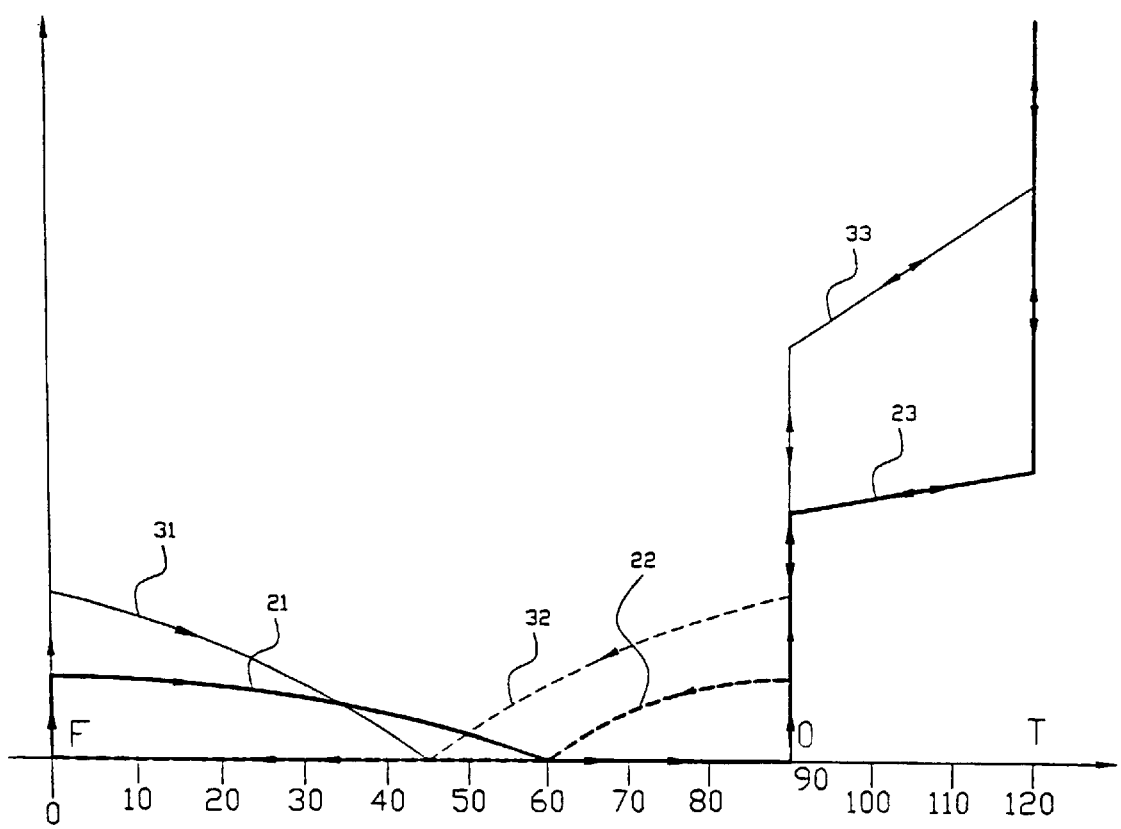
FIG. 5 is a graph indicating effort as a function of the angular position of the side-piece vis-à-vis the front and comparing an ordinary hinge with a hinge according to the invention.

In the rest of the description, an identical element bears an identical reference in the various figures.

The elastic hinge according to the invention is intended for any spectacle frame which comprises, in known manner, two lenses connected to one another by a bridge to form a substantially flat front, and two lateral side-pieces which are each articulated on the front by a hinge. Represented in FIG. 1 is a side-piece 3 of the frame, which side-piece is articulated on a front lug 1 by a hinge 10. The lug is bent practically at right angles, so that it has a longitudinal direction L which is substantially perpendicular to the front, which is not represented.

The lug is perforated in the longitudinal direction L by a blind hole, so as to accommodate therein a fixed hinge element 5 which is connected to the front. The side-piece 3 is likewise perforated by a blind hole in a direction substantially parallel to the side-piece, so as to accommodate therein a mobile hinge element 7 which is connected to the said side-piece. The two hinge elements each have a pivoting head 5A, 7A which tops an intermediate body 5I, 7I and a cylindrical body 5B, 7B. The latter extends in an axial direction A1, A2.

The cylindrical body 5B of the fixed hinge element 5 is inserted in the blind hole in the front lug 1 until it abuts against the latter via a projection 5C. The cylindrical body 7B of the mobile hinge element 7 is likewise inserted in the blind hole in the side-piece 3 until it abuts against the latter via a projection 7C. The heads 5A and 7A consequently project in relation to the blind holes in the front lug 1 and side-piece 3 in which the hinge elements are accommodated.

The pivoting head 7A of the mobile hinge element 7 comprises—FIGS. 3a–3b—two identical, cylindrical male knuckles 7E which extend parallel and in a symmetrical manner in relation to the axial direction A2 of the said hinge element. The two knuckles 7E are inscribed, over a sector with an angle $\alpha$ of about 230 degrees, in a diagram cylinder whose axis constitutes an axis of rotation R2 of the hinge element 7.

The pivoting head 5A of the fixed hinge element 5 possesses—FIGS. 2a–2b—two identical female knuckles 5E which extend parallel and in a symmetrical manner to the axial direction A1 of the said hinge element. The two female knuckles are connected by a guide surface S which forms the bottom of a cavity which is open on the side opposite the intermediate body 5I. The guide surface S follows, over a sector with an angle $\beta$ of about 150 degrees, the lateral wall of a diagram cylinder whose axis constitutes an axis of rotation R1 of the hinge element 5.

The two hinge elements 5 and 7 are each perforated by an internal duct 5D, 7D which extends in the axial direction A1, A2 of the cylindrical body 5B, 7B and which opens into the head 5A, 7A of the hinge elements. The internal ducts are intended to accommodate a link passing successively through the hinge elements and the male and female knuckles so as to join them to one another like a pivot.

The guide surface S—FIG. 2a—is set off towards the inside of the frame in relation to the duct 5D. In other words, the axis of rotation R1 is offset inwards in relation to the axial direction A1 of the duct 5D. The two male knuckles 7E are likewise set off—FIG. 3a—towards the inside of the frame in relation to the duct 7D. In other words the axis of rotation R2 is offset inwards in relation to the axial direction A2 of the duct 7D. As will be indicated further on, the axis of rotation R2 merges with the axis of pivoting of the side-piece between the closing position and the normal opening position.

As illustrated by FIG. 4a, at the hinge element 5 connected to the front, the link 9 is crimped in a cylindrical socket 11 which possesses a diameter substantially equal to that of the cylindrical body 5B and against which the said socket abuts. At the mobile hinge 7, the link 9 is crimped in a cylindrical socket 13 which possesses a diameter substantially equal to that of the cylindrical body 7B.

In the mode of embodiment chosen to illustrate the invention, the link 9 is flexible and non-extensible, that is to say is able to follow a curve without becoming significantly longer compared to its straight length when at rest. In this case, the link 9 is threaded inside a helical spring 15 before being crimped in the cylindrical socket 13 at the hinge element connected to the side-piece. The length of the link between the two sockets 11 and 13 is chosen so as to force the helical spring 15 to become compressed. As a result of this arrangement, the spring abuts, on the one hand, against the cylindrical body 7B and, on the other, against the cylindrical socket 13. According to another mode of embodiment of the invention, which is not illustrated in the drawings, the link is, by nature, elastic, that is to say lengthens in a manner proportional to a tensile force exerted at one of its ends. In this case, the cylindrical socket 13 at the mobile hinge element abuts directly against the cylindrical body 7B, the link being stretched between the two sockets, compared with its length when at rest. The intention is still to fit a spring, even with a link which is, by nature, elastic.

When the two knuckles are joined together with the aid of the link, the head 7A of the side-piece knuckle is inserted in the head 5A of the front knuckle. At the same time, the male knuckles 7E come into contact with the guide surface S of the head 5A, by inserting themselves between the female knuckles 5E. The distance between the two female knuckles 5E is slightly greater than the distance between the two male knuckles 7E in order to permit insertion. The radius of the guide surface S is the same as the radius of the cylindrical male knuckles 7E, so that the axes of rotation R1 and R2 of the female and male knuckles coincide. The guide surface S thus allows the mobile hinge element 7 to pivot, in relation to the fixed hinge element 5, about an axis of rotation R which designates the axis of rotation R1 or the axis of rotation R2, without distinction.

When the frame is assembled—FIG. 1—the two hinge elements 5 and 7 are first of all joined together by inserting the link 9 and by crimping the latter in the sockets 11 and 13, after threading the said link into the helical spring 15, in the case of a non-extensible link. The two elements which have been joined together are then in the condition illustrated in FIG. 4a. The hinge element 5 and the cylindrical socket 11 are then inserted, together, in the blind hole in the front lug 1, and the hinge element 7, the helical spring 15 and the cylindrical socket 13 are inserted, together, in the blind hole in the side-piece 3. The hinge elements are interlocked with the lug and side-piece, for example by bonding or force fitting.

FIG. 4a illustrates a normal opening position of the side-piece in relation to the front of the frame. In this position, the hinge elements 5 and 7 are in alignment, that is to say the axial directions A1 and A2 coincide with one another in a single axial direction A. The link 9 is straight and parallel to the axial direction A.

FIG. 4b illustrates a closing position of the side-piece in relation to the front of the frame. In this position, the two hinge elements are at right angles, that is to say their axial directions A1 and A2 are substantially perpendicular. The link 9 is curved in the region of insertion of the pivoting heads 5A and 7A so as to follow the change in direction of the axial directions A1 and A2.

In order to open or close the side-piece of the frame, the mobile hinge element connected to the said side-piece pivots about the axis of rotation R in relation to the fixed hinge element connected to the front. The region contained between the front and the two side-pieces is referred to, by convention, as the "inside" of the frame. In this way, closure corresponds to rotation of the side-piece towards the inside of the frame, and opening, to rotation towards the outside.

When the side-piece pivots from the normal opening position—FIG. 4a—into the closing position—FIG. 4b—the link 9 is offset from an outer side to an inner side in relation to the axis of rotation R. The return torque created by the tensile force of the link is cancelled when the middle fibre of the link is plumb with the axis of rotation. This results in a bistable effect which tends to return the side-piece to the closing position or to the normal opening position, according to whether the link is on the inside or outside in relation to the axis of rotation.

When the side-piece is in the normal opening position—FIG. 4a—the middle fibre of the link 9 extends parallel to the common axial direction A, and is offset towards the outside of the frame in relation to the axis of rotation R. The hinge element 5 then exerts on the hinge element 7, via the link 9, a tensile force which creates a torque that tends to cause the side-piece to pivot outwards into an over-opening position.

According to the invention, the female pivoting head 5A possesses, at the mouth of the duct 5D, a stop B1 which forms, as a result of complementarity of shape with a stop B2 at the mouth of the duct 7D in the pivoting head 7A, an interface for pivoting about a second axis of rotation R'. The stops B1 and B2 are formed on the outer side of the frame.

When the side-piece is in the normal opening position—FIG. 4a—the link 9 is straight and is disposed between the two axes of rotation R and R'. The two complementary stops B1 and B2 make it possible to neutralise the torque that tends to cause the side-piece to pivot outwards into an over-opening position. In other words, the normal opening position is a stable position.

The stop B1 on the pivoting head 5A is inscribed—FIG. 2a—over a sector with an angle of about 120 degrees, in a diagram cylinder whose axial direction constitutes a second axis of rotation R'1 parallel to the first axis of rotation R1. The two axes of rotation R1 and R'1 are aligned in a direction L1 substantially perpendicular to the axial direction A1 of the hinge element 5 and are spaced apart from one another in such a way that the guide surface S connecting the two female knuckles 5E is tangent to the stop B1.

The stop B2 on the pivoting head 7A likewise follows— FIG. 3a—over a sector with an angle γ of about 120 degrees, a diagram cylinder whose axial direction constitutes a second axis of rotation R'2 parallel to the first axis of rotation R2. The two axes of rotation R2 and R'2 are aligned in a direction L2 substantially perpendicular to the axial direction A2 of the hinge element 7 and are spaced apart from one another in such a way that each of the male knuckles 7E is tangent to the stop B2.

The stop B1 is set off towards the outside of the frame in relation to the duct 5D in the hinge element 5. In other words, the second axis of rotation R'1 is offset towards the outside of the frame in relation to the axial direction A1. The stop B2 is likewise set off towards the outside of the frame in relation to the duct 7D in the hinge element 7. In other words, the second axis of rotation R'2 is offset towards the outside of the frame in relation to the axial direction A2.

When the two knuckles are joined together with the aid of the link 9, the stops B1 and B2 come into contact with one another. These stops have the same radius of curvature, so that the second axes of rotation R'1 and R'2 coincide when the pivoting heads are joined together by the link 9. The stop B1 allows the hinge element 7 to pivot, in relation to the hinge element 5, about the second axis of rotation R' which designates the axis of rotation R'1 or R'2, without distinction.

The stops B1 and B2 are arranged as a result of complementarity of shape at a pivoting interface so as to allow the side-piece to pivot from the stable normal opening position to an extra outward opening position which is illustrated in FIG. 4c.

In the course of over-opening, the pivoting heads 5A, 7A move apart or are uncoupled from one another and the male knuckles 7E and female knuckles 5E reduce their contact surface.

The link 9 passes successively through the pivoting heads 5A and 7A and is supported on the stop B1 on the outer side of the frame. In this way, it remains offset inwards in relation to the second axis of rotation R' formed by the interface for the pivoting of the stops B1 and B2.

As a result of this arrangement, the tensile force of the link creates a torque for returning the side-piece that tends to oppose the pivoting of the latter in relation to the second axis of rotation R'. This return torque is counterbalanced only when the pivoting heads are inserted in one another again and when the male knuckles are in contact with the guide surface S connecting the two female knuckles, that is to say in the normal opening position. In other words, the over-opening position is unstable.

It should advantageously be noted that the spring 15 acts as an over-opening stop when it is compressed as far as possible.

The duct 7D—FIG. 3a—preferably opens into the pivoting head 7A via a wind-round surface V2 which is formed in the intermediate body 7I and is turned towards the inside of the frame, that is to say has a vector of curvature U2 which is directed towards the inside of the frame in accordance with the convention defined above.

The duct 5D also preferably opens—FIG. 2a—into the pivoting head 5A via a wind-round surface V1 which is formed in the intermediate body 5I and is turned towards the inside of the frame, that is to say has a vector of curvature U1 which is directed towards the inside of the frame.

As a result of these arrangements, the link 9 is deformed by following the wind-round surfaces V1, V2 when the side-piece pivots about the axis of rotation R into its closing position. The curvature of the wind-round surfaces V1 and V2 is advantageously the same and is, for example, circular in order to accompany the winding-round of the link.

According to a variant of embodiment of the invention, the female knuckles 5E have an internal wall 5F which is slightly inclined, for example by 15 degrees, in relation to the axial direction A1. The male knuckles 7E can thus be displaced in the direction of inclination of the female knuckles 5E. This results in a possible swaying movement of the side-piece in relation to the front, in a plane perpendicular to the plane of pivoting.

In FIG. 5, a graph shows a comparison between a hinge according to the invention and an ordinary elastic spring hinge using a hinge element which is shaped in the form of a cam and is mobile in rotation about an axis of rotation.

Plotted in the form of an arbitrary linear unit on the ordinate of the graph is the modulus of the effort which a user has to apply in order to make the side-piece pivot in relation to the front of the frame. This effort is measured at the same distance from the axis of rotation of the hinge in both cases. The angle of rotation of the side-piece in relation to the front is plotted on the abscissa. The abscissa F corresponds to the closing position of the side-piece, the abscissa O to the normal opening position, and the abscissa T to an extra opening of the side-piece of about 30 degrees in relation to the abscissa O. The curves corresponding to the hinge according to the invention are shown in thick lines, and those corresponding to the hinge for comparison purposes, in thin lines. The continuous lines indicate opening of the frame, and the dotted lines indicate closing.

The curve 21 indicating the effort for opening the hinge according to the invention shows that the effort for opening the side-piece is lower than the effort for opening the ordinary hinge. This results in a sense of ease of opening of the side-pieces which favours the hinge of the invention.

When the side-piece is closed—curve 22—the closing effort is very low, which brings a sense of lightness, a simple impact being sufficient to close the frame. By comparison, closure of the ordinary hinge—curve 32—requires a greater effort. It will also be noted that the angle of compensation, that is to say the angle in respect of which the return torque created by the tensile force is cancelled, is of the order of 60 degrees in the case of a hinge according to the invention, whereas it is 45 degrees in the case of a cam-type hinge. As this angle corresponds to the triggering of automatic closure, the side-piece of the hinge according to the invention does not have to be accompanied for such a long time in order to close the frame.

In the extra opening position—curve 23—the effort rises sharply as a result of the threshold effect so as to reach a plateau. This results in a sense of flexibility in extra opening. By comparison, the extra opening effort of the ordinary hinge—curve 33—rises sharply then increases in a linear manner with the angle of pivoting, a fact which creates a sense of resistance in constant increase.

The fixed element 5 and mobile element 7 of the hinge are advantageously manufactured by a plastic material injection process or a metal powder injection moulding process.

The elastic hinge according to the invention permits both a stable closing position and a stable opening position, and an unstable over-opening position. The pivoting heads achieve these three positions without recourse to an articulating screw, a fact which eliminates the risk of unscrewing and of the screw being lost. The link joining the two pivoting heads together is accommodated in the ducts, in such a way that it is invisible from the outside of the frame. The pivoting heads are inserted in one another in the longitudinal direction of the side-piece in a continuous profile and lend an integrated aesthetic quality to the hinge.

What is claimed is:

1. An elastic spectacle-frame hinge comprising:

two hinge elements, a fixed element and a mobile element, which are connected to a front and to a side-piece of the frame respectively and are articulated in relation to one another about an axis of rotation (R) by a first pivoting head on one of the fixed and mobile elements, which first head is inserted in a second pivoting head on the other element, and by a link which is successively accommodated in an internal duct in the fixed and mobile elements which opens into the first and second pivoting heads and is offset in relation to the axis of rotation, from an inner side to an outer side of the frame when the side-piece pivots, in relation to the front, from a closing position to a normal opening position, characterised in that each of the first and second pivoting heads possess a stop at a mouth of the internal duct on an outer side of the frame, which form, as a result of complementarity of shape of a first stop with a second stop, an interface for pivoting about a second axis of rotation (R'), the link being disposed between the two axes of rotation (R, R') when the side-piece is in the normal opening position.

2. The hinge according to claim 1, wherein the mobile pivoting head possesses two male knuckles inserted between two female knuckles connected to the fixed pivoting head by a guide surface (S), the link passing through the guide surface (S) and being threaded between the male and female knuckles, characterised in that the male knuckles are tangent to the second stop on the mobile hinge element and the guide surface (S) is tangent to the first stop on the fixed hinge element.

3. The hinge according to claim 2, wherein the female knuckles have an internal wall which is inclined in relation to an axial direction (A1) of the fixed hinge element.

4. The hinge according to claim 1, wherein the ducts for the passage of the link open into the first and second pivoting heads via a wind-round surface (V1, V2) which is turned towards the inside of the frame.

5. The hinge according to claim 4, wherein the wind-round surfaces (V1, V2) possess the same radius of curvature.

6. The hinge according to claim 1, wherein the link is fixed to the fixed hinge element by a first socket, and to the mobile hinge element by a second socket.

7. The hinge according to claim 6, wherein the link is, by nature, elastic.

8. The hinge according to claim 6, wherein the link is essentially non-extensible and is threaded inside a helical spring intercalated between the mobile hinge element and the second socket.

9. The hinge according to claim 8, wherein the spring acts as an over-opening stop.

10. A process for manufacturing a fixed element or a mobile element of a hinge according to claim 1, wherein a plastic material injection process or a metal powder injection moulding process is used.

* * * * *

UNITED STATES PATENT AND TRADEMARK OFFICE
CERTIFICATE OF CORRECTION

PATENT NO.   : 6,481,053 B2                                                    Page 1 of 1
DATED        : November 19, 2002
INVENTOR(S)  : Christophe Desbiez-Piat It is certified that error appears in the above-identified patent and that said Letters Patent is hereby corrected as shown below:

Column 4,
Line 57, please correct the line as follows:

-- female knuckles 5E, so that the axes of rotation R1 and R2 of --

Signed and Sealed this

Twenty-fifth Day of February, 2003

JAMES E. ROGAN
*Director of the United States Patent and Trademark Office*